(12) United States Patent
Takatani

(10) Patent No.: US 9,513,853 B2
(45) Date of Patent: *Dec. 6, 2016

(54) DATA PROCESSING APPARATUS CAPABLE OF CONTROLLING POWER SUPPLY, CONTROL METHOD THEREFOR, AND STORAGE MEDIUM

(71) Applicant: CANON KABUSHIKI KAISHA, Tokyo (JP)

(72) Inventor: Tamotsu Takatani, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/580,584

(22) Filed: Dec. 23, 2014

(65) Prior Publication Data

US 2015/0109635 A1    Apr. 23, 2015

Related U.S. Application Data

(63) Continuation of application No. 13/356,710, filed on Jan. 24, 2012, now Pat. No. 8,954,772.

(30) Foreign Application Priority Data

Jan. 26, 2011    (JP) .................................. 2011-014043

(51) Int. Cl.
    *G06F 1/26*       (2006.01)
    *G06F 3/12*       (2006.01)
    (Continued)

(52) U.S. Cl.
    CPC ........... *G06F 3/1221* (2013.01); *G06F 3/1229* (2013.01); *H04N 1/00896* (2013.01); *H04N 1/00904* (2013.01); *G06F 1/3284* (2013.01); *Y02B 60/1267* (2013.01)

(58) Field of Classification Search
    CPC .............. G06F 3/1221; G06F 3/1229; H04N 1/00896; H04N 1/00904

USPC .................................................. 713/300, 320
See application file for complete search history.

(56) References Cited

U.S. PATENT DOCUMENTS 5,630,142 A    5/1997   Crump
7,181,188 B2   2/2007   Vu et al.
(Continued)

FOREIGN PATENT DOCUMENTS

| JP | 05073179 A1  | 3/1993  |
| JP | 08087361 A   | 4/1996  |
| JP | 2004140503 A | 5/2004  |
| JP | 2007293806 A | 11/2007 |

OTHER PUBLICATIONS

Notice of Allowance dated Oct. 29, 2013 issued in U.S. Appl. No. 13/356,710.
(Continued)

*Primary Examiner* — Mark Connolly
(74) *Attorney, Agent, or Firm* — Rossi, Kimms & McDowell LLP

(57) ABSTRACT

A data processing apparatus that has first to fourth power modes in which power consumption becomes larger in this order, and is capable of changing into a mode selected and set by a user. A receiving unit receives the instruction for bringing the data processing apparatus into the third power mode or the fourth power mode. A first transition unit brings, when the apparatus is working in the second power mode, the apparatus into the first power mode in response to the receiving unit receiving the transition instruction. A determination unit determines which mode the apparatus is to be brought into between the third power mode and the fourth power mode in response to the first transition unit bringing the apparatus into the first power mode. A second transition unit brings the apparatus into a power mode determined by the determination unit.

42 Claims, 4 Drawing Sheets

(51) Int. Cl.
*H04N 1/00* (2006.01)
*G06F 1/32* (2006.01)

(56) References Cited

U.S. PATENT DOCUMENTS

| | | |
|---|---|---|
| 7,383,450 B2 | 6/2008 | Rothman et al. |
| 7,523,323 B2 | 4/2009 | Rothman et al. |
| 8,769,326 B2 * | 7/2014 | Liu ............................... 713/324 |
| 2004/0076062 A1 | 4/2004 | Ueda et al. |
| 2005/0066207 A1 | 3/2005 | Fleck et al. |
| 2011/0231643 A1 | 9/2011 | Kimura et al. |

OTHER PUBLICATIONS

Notice of Allowance dated Mar. 4, 2014 issued in U.S. Appl. No. 13/356,710.
Notice of Allowance dated Jun. 6, 2014 issued in U.S. Appl. No. 13/356,710.
Notice of Allowance dated Sep. 25, 2014 issued in U.S. Appl. No. 13/356,710.

* cited by examiner

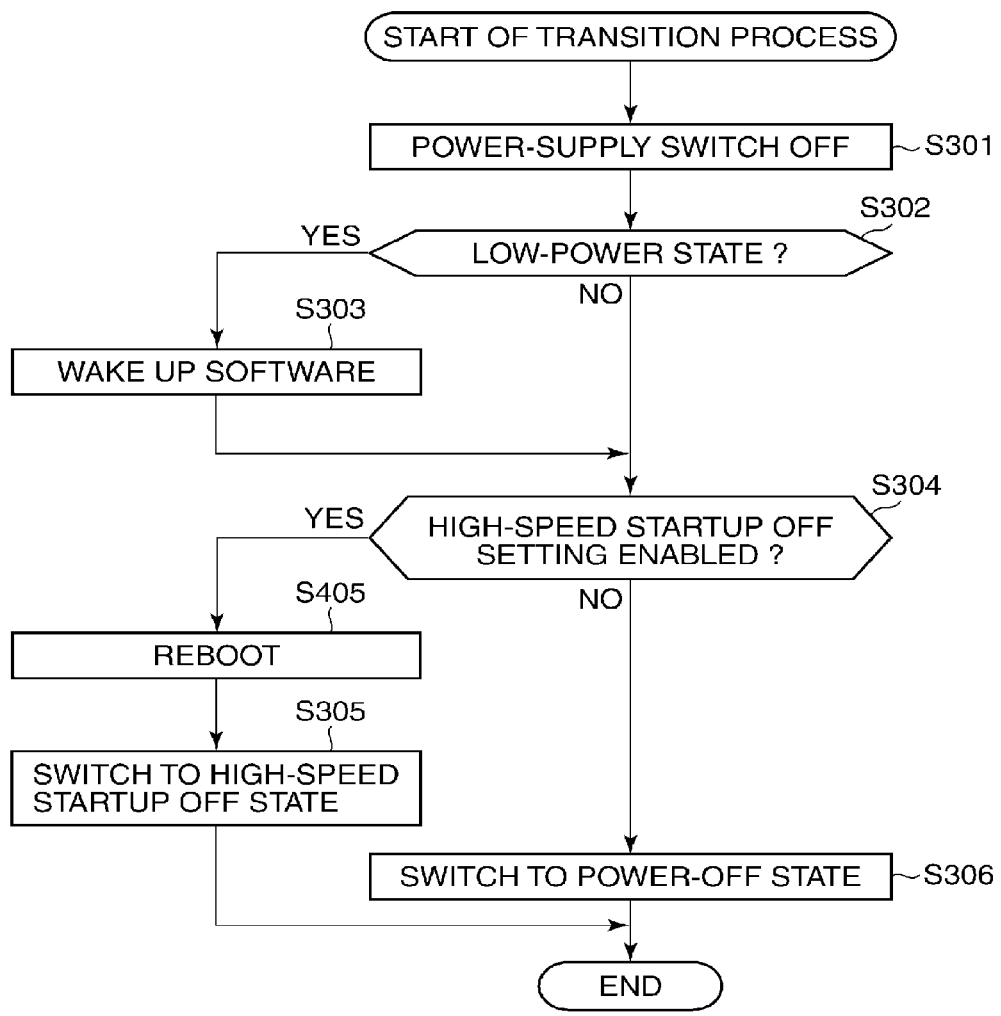

(12) United States Patent
US 9,513,853 B2

DATA PROCESSING APPARATUS CAPABLE OF CONTROLLING POWER SUPPLY, CONTROL METHOD THEREFOR, AND STORAGE MEDIUM

BACKGROUND OF THE INVENTION

Field of the Invention

The present invention relates to a data processing apparatus, a control method therefor, and a computer-readable storage medium storing a control program for implementing the method.

Description of the Related Art

In general, as exemplary data processing apparatuses, there have been known image forming apparatuses that execute a print job according to image data. In recent years, image forming apparatuses have been made multifunctional, and accordingly, the arrangements of the image forming apparatuses have become increasingly complicated. For this reason, in the image forming apparatuses, the time required to activate software tend to increase.

There has been the technique that in order to reduce the time required to activate software in an image forming apparatus, electric current is passed through a volatile memory such as a DRAM when a power-supply switch of the image forming apparatus is turned off (see, for example, Japanese Laid-Open Patent Publication (Kokai) No. H05-73179). Thus, when the power-supply switch is turned on, the image forming apparatus is returned from a status stored in the DRAM so as to reduce the time required to activate software.

As described above, in the case where electric current is passed through the DRAM when the power-supply switch is turned off, only a small amount of electrical power is consumed. For this reason, with consideration given to reduction in power consumption, the user is caused to determine whether or not to pass electric current through the DRAM when the power-supply switch is turned off. Namely, two statuses consisting of a state in which power consumption is zero and a status in which electric current is passed through the DRAM are prepared, and the user is caused to select one of these two statuses.

In this case, when the power-supply switch is turned off, it is necessary to determine one of the two statuses into which the image forming apparatus is to switch, and moreover, it is necessary to make preparations for changing into one of the two statuses.

In general, image forming apparatuses has a standby mode (a state of being ready to execute a print job) and a sleep mode (power saving mode) in which power consumption is smaller than in the standby mode. In such image forming apparatuses, when the power-supply switch is turned off in the power saving mode, an AC power source is interrupted in response to the turning-off of the power-supply switch, so that the power is immediately turned off.

On the other hand, according to Japanese Laid-Open Patent Publication (Kokai) No. H05-73179, although a CPU carries out the above described process upon detecting the turning-off of the power-supply switch, it is difficult to switch into one of the above described two statuses when the power-supply switch is turned off. Namely, when the power-supply switch is turned off, it is difficult to switch the image forming apparatus into a status selected and set by the user.

SUMMARY OF THE INVENTION

The present invention provides a data processing apparatus capable of changing into a state selected and set by a user when a power source is turned off in a sleep mode, a method of controlling the same, and a computer-readable storage medium storing a control program for implementing the method.

Accordingly, a first aspect of the present invention provides a data processing apparatus that includes a process unit for processing data and has a first power mode in which the process unit works, a second power mode in which the process unit does not work and power consumption is smaller than in the first power mode, a third power mode in which the process unit does not work and power consumption is smaller than in the second power mode, and a fourth power mode in which the process unit does not work and power consumption is smaller than in the third power mode, comprising a receiving unit configured to receive from a user a transition instruction for bringing the data processing apparatus into the third power mode or the fourth power mode, a first transition unit configured to, when the data processing apparatus is working in the second power mode, bring the data processing apparatus into the first power mode in response to the receiving unit receiving the transition instruction, a determination unit configured to determine which mode the data processing apparatus is to be brought into between the third power mode and the fourth power mode in response to the first transition unit bringing the data processing apparatus into the first power mode, and a second transition unit configured to bring the data processing apparatus into a power mode determined by the determination unit.

Accordingly, a second aspect of the present invention provides a method of controlling a data processing apparatus that includes a process unit for processing data and has a first power mode in which the process unit works, a second power mode in which the process unit does not work and power consumption is smaller than in the first power mode, a third power mode in which the process unit does not work and power consumption is smaller than in the second power mode, and a fourth power mode in which the process unit does not work and power consumption is smaller than in the third power mode, comprising a receiving step of receiving from a user a transition instruction for bringing the data processing apparatus into the third power mode or the fourth power mode, a first transition step of, when the data processing apparatus is working in the second power mode, bringing the data processing apparatus into the first power mode in response to the transition instruction is received in the receiving step, a determination step of determining which mode the data processing apparatus is to be brought into between the third power mode and the fourth power mode in response to the data processing apparatus is brought into the first power mode in the first transition step, and a second transition step of bringing the data processing apparatus into a power mode determined in the determination step.

Accordingly, a third aspect of the present invention provides a computer-readable non-transitory storage medium storing a control program for controlling a data processing apparatus that includes a process unit for processing data and has a first power mode in which the process unit works, a second power mode in which the process unit does not work and power consumption is smaller than in the first power mode, a third power mode in which the process unit does not work and power consumption is smaller than in the second power mode, and a fourth power mode in which the process unit does not work and power consumption is smaller than in the third power mode, the method comprising a receiving step of receiving from a user a transition instruction for bringing the data processing apparatus into the third power mode or the fourth power mode, a first transition step of, when the data processing apparatus is working in the second power mode, bringing the data processing apparatus into the first power mode in response to the transition instruction is received in the receiving step, a determination step of determining which mode the data processing apparatus is to be brought into between the third power mode and the fourth power mode in response to the data processing apparatus is brought into the first power mode in the first transition step, and a second transition step of bringing the data processing apparatus into a power mode determined in the determination step.

According to the present invention, if the user sets a high-speed startup off mode in a case where the power source is turned off in the sleep mode, changing into the high-speed startup off mode can be done.

Further features of the present invention will become apparent from the following description of exemplary embodiments (with reference to the attached drawings).

BRIEF DESCRIPTION OF THE DRAWINGS

FIG. 4 is a flowchart useful in explaining a transition process carried out in an image forming apparatus according to a second embodiment of the present invention.

DESCRIPTION OF THE EMBODIMENTS

A description will now be given of an exemplary data processing apparatus according to an embodiment of the present invention. It should be noted that here, an image forming apparatus which is an exemplary data processing apparatus will be given as an example, the present invention may be similarly applied to any data processing apparatus other than image forming apparatuses.

Figure 1:
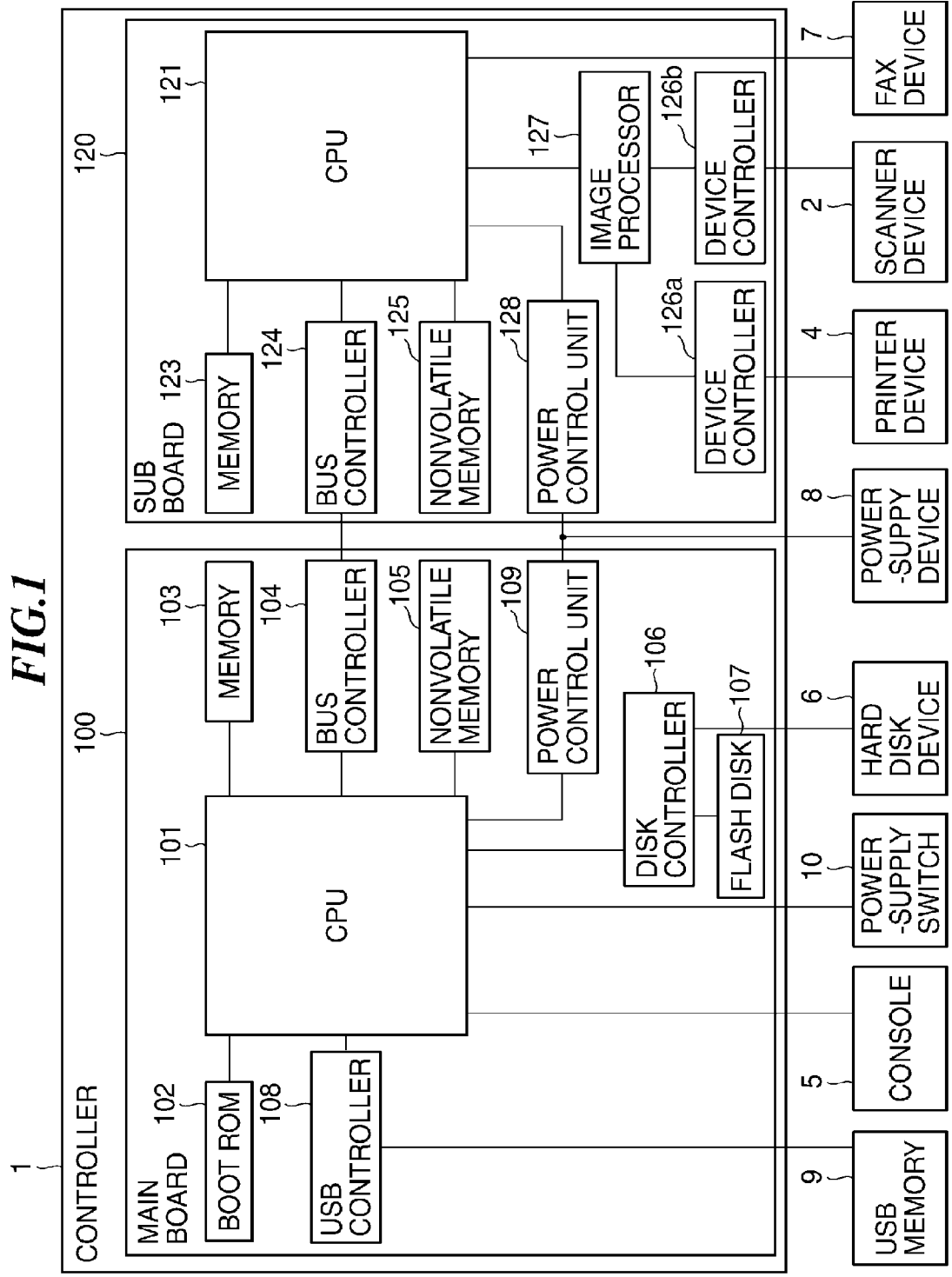
FIG. 1 is a block diagram showing an exemplary controller used in an image forming apparatus according to a first embodiment of the present invention.

FIG. 1 is a block diagram showing an exemplary controller used in the image forming apparatus according to the first embodiment of the present invention.

Referring to FIG. 1, a controller 1 has a main board 100 and a sub board 120. The main board 100, which is a general-purpose CPU system, has a CPU 101. The CPU 101 is responsible for controlling the entire main board. A boot ROM 102 stores a boot program, and a memory 103 is used as a work memory by the CPU 101.

The main board 100 has a bus controller 104 and a nonvolatile memory 105, and the bus controller 104 has the function of bridging with an external bus. It should be noted that the nonvolatile memory 105 holds stored data or the like even when the power is off.

In the example shown in the figure, the main board 100 has a disk controller 106, a USB controller 108, and a power control unit 109. The disk controller 106 controls storage devices (here, a flash disk 107 and a hard disk device 6). A USB memory 9, for example, is connected to the USB controller 108, which controls the USB memory 9. It should be noted that the flash disk (such as an SSD) 107 is comprised of a semiconductor device and is a relatively low-capacity storage device.

As shown in the figure, a console 5, a power-supply switch 10, a hard disk device 6, and a power-supply unit 8 as well as the USB memory 9 described above are connected to the main board 100. Specifically, the console 5 and the power switch 10 are connected to the CPU 101. Also, the power-supply unit 8 is connected to the power control unit 109. It should be noted that any other storage device may be used in place of the hard disk device 6 as long as it is a non-volatile device.

The sub-board 120, which is a relatively small general-purpose CPU system as compared to the main board 100, has a CPU 121. The CPU 121 is responsible for controlling the entire sub-board. A memory 123 is used as a work memory by the CPU 121.

The sub-board 120 has a bus controller 124 and a non-volatile memory 125, and the bus controller 124 has the function of bridging with an external bus. Further, the sub-board 120 has an image processor 127 and a power control unit 128, and the power-supply device 8 is connected to the power control unit 128.

In the example shown in the figure, a fax device 7 is connected to the CPU 121, and a printer device (printer unit) 4 and a scanner device (scanner unit) 2 are connected to an image processor 127 via device controllers 126a and 126b, respectively. The image processor 127 carries out digital image processing in real time under the control of the CPU 121, and sends and receives digital image data to and from the printer device 4 and the scanner device 2 via the device controllers 126a and 126b.

For example, original data scanned in by the scanner device 2 is subjected to image processing by the image processor 127 and sent as image data to the printer device 4. Then, the printer device 4 executes a print job according to the image data. Also, when a fax is to be sent, image data is sent from the image processor 127 to the CPU 121, which in turn sends the image data via fax by controlling the fax device 7.

Power is fed from the power-supply device 8 to the main board 100 and the sub board 120, and the power control units 109 and 128 control power feeding to the main board 100 and the sub-board 120. The power-supply switch 10 is operated by the user and turned on and off by the power-supply switch 10. When the power-supply switch 10 is operated, a power supply operation interrupt is sent to the CPU 101. Upon detecting the power supply operation interrupt, the CPU 101 controls the power control units 109 and 128 according to the state of the image forming apparatus as will be described later.

It should be noted that although the block diagram of FIG. 1 is a simplified one, and actually, the CPU 101, the CPU 121, and so on include a large number of CPU peripheral hardware such as a chipset, a bus bridge, and a clock generator, description thereof is omitted because they are unnecessary in the description of the first embodiment.

Next, a description will be given of the operation of the controller 1 appearing in FIG. 1 by taking copying as an example.

Here, when the user instructs copying by operating the console 5, the CPU 101 sends an image reading instruction to the CPU 121 via the bus controllers 104 and 124. As a result, the CPU 121 controls the image processor 127, causing the scanner device 2 to scan in an image.

The scanner device 2 inputs an image signal (digital image signal) obtained as a result of optically scanning an original to the image processor 127 via the device controller 126. The image processor 127 carries out predetermined image processing on the image signal to obtain image data. Then, under the control of the CPU 121, the image processor 127 transfers the image data to the memory 123 by DMA and temporarily stores the same in the memory 123.

Upon ascertaining that a predetermined amount or all of the image data obtained as a result of scanning has been stored, the CPU 101 sends an image output instruction to the CPU 121. Accordingly, the CPU 121 instructs the printer device 4 to output an image via the image processor 127. On this occasion, the CPU 121 notifies the image processor 127 of the position (address) of image data on the memory 123.

In accordance with a synchronization signal from the printer device 4, the CPU 121 sends the image data on the memory 123 to the printer device 4 via the image processor 127 and the device controller 126a. As a result, the printer device 4 prints an image on a recording sheet according to the image data.

It should be noted that when a plurality of copies are to be made, the CPU 101 temporarily stores the image data on the memory 123 in the hard disk device 6, and when making the second and subsequent copies, the CPU 101 reads out the image data from the hard disk device 6 without causing the scanner device 2 to perform scanning, and sends the image data to the printer device 4.

Figure 2:
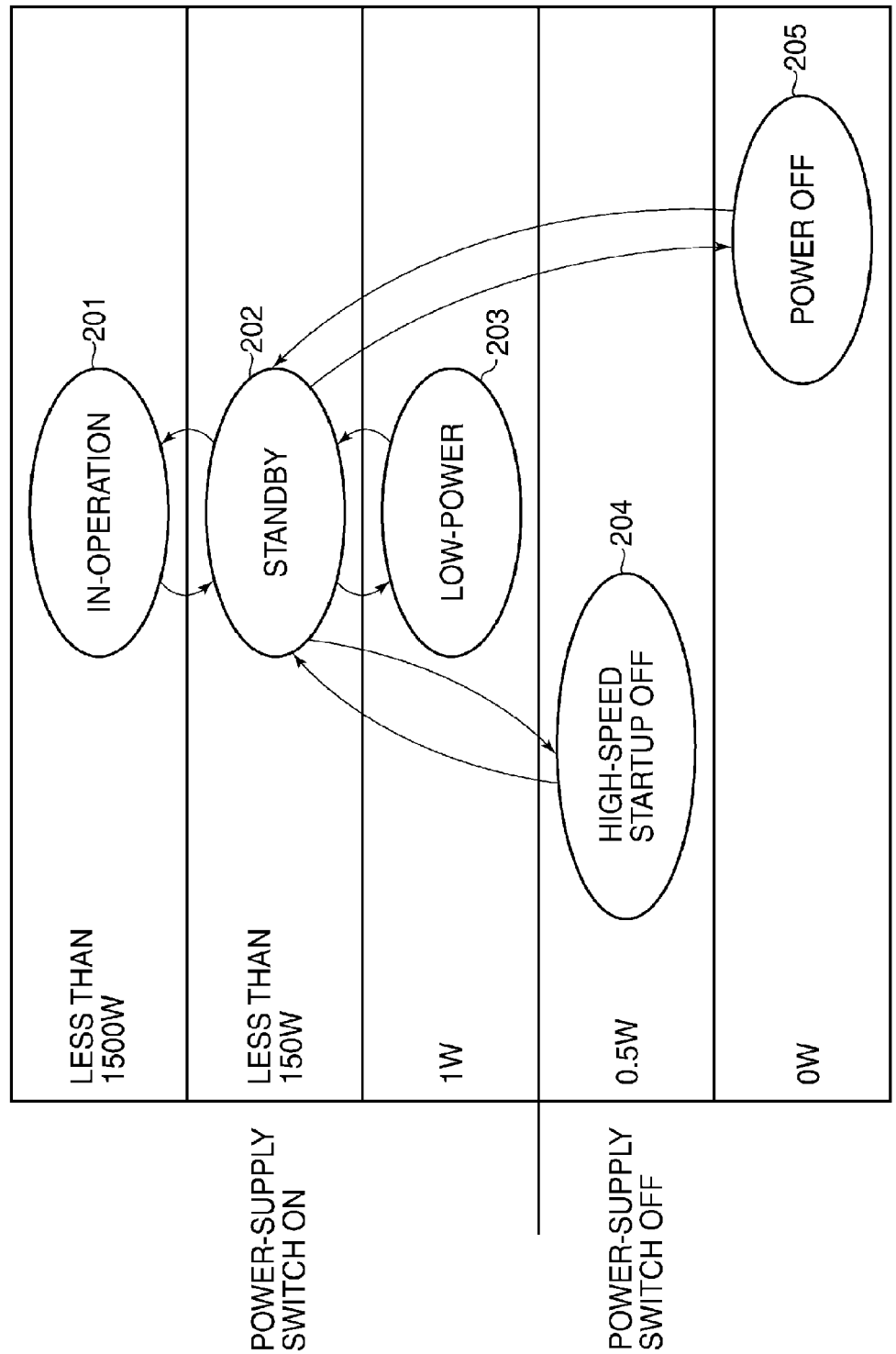
FIG. 2 is a diagram showing an exemplary state of power supply and power consumption in the image forming apparatus shown in FIG. 1.

FIG. 2 is a diagram showing an exemplary state of power supply and power consumption in the image forming apparatus shown in FIG. 1.

The image forming apparatus described above with reference to FIG. 1 has a standby mode in which a print job is ready to be executed (that is, information processing is ready to be executed: first power mode), and a sleep mode (low-power state: second power mode) in which power consumption is smaller than in the standby mode. When the power-supply switch 10 is on, the image forming apparatus lies in a running state 201, a standby state (standby mode) 202, and a low-power state 203. When the power-supply switch 10 is off, the image forming apparatus lies in a high-speed startup off state (high-speed startup off mode: third power mode) 204 and a power-off state (power-off mode: fourth power mode) 205.

The running state 201 is a state where the image forming apparatus is working to accept jobs (for example, print jobs). Here, different devices operate according to jobs, and hence power consumption in the running state 201 cannot be uniformly expressed, but power consumption is 1500 W or less for the sake of convenience.

The state from which the image forming apparatus switches into the running state 201 is only the standby state 202. The standby state 202 is a state where the image forming apparatus is waiting for a job. In the standby state 202 as well, power consumption varies with devices, and hence power consumption is 150 W or less for the sake of convenience. The image forming apparatus switches into the standby state 202 from each of the running state 201, the low-power state 203, high-speed startup off state 204, and power-off state 205.

In the low-power state 203, jobs can be accepted, but it takes time to return to the standby state. In the image forming apparatus shown in the figure, the passage of electric current to components other than devices required to accept jobs, the memory 103, and the power-supply switch 10 is interrupted to realize high-speed return and low power consumption. The low-power state 203 is a so-called 1 W sleep (deep sleep) state. The image forming apparatus switches from the standby state 202 into the low-power state 203.

The high-speed startup off state 204 is a state where the power-supply switch 10 is off, but electric current is passed through some devices so as to activate the image forming apparatus at high speed. In the high-speed startup off state 204, for example, electric current is passed through only the memory 103 and the power-supply switch 10 to consume an extremely small amount of power. Electric current is passed through the volatile memory 103 such as a DRAM to hold software (programs) executed by the CPU 101 in the memory 103. As a result, when the power-supply switch 10 is turned on, the time required to initialize software can be reduced, and software can be activated at high speed.

The difference between the low-power state 203 and the high-speed startup off state 204 lies in that in the high-speed startup off state 204, the passage of electric current through all the devices that accept jobs is interrupted. The image forming apparatus switches between the high-speed startup off state 204 and the standby state 202.

The power-off state 205 is a state in which the power-supply switch 10 is turned off and the passage of electric current through all the devices that accept jobs is interrupted (power consumption is zero). The image forming apparatus switches between the power-off state 205 and the standby state 202.

Incidentally, although shown in the state transition in FIG. 2, when the power-supply switch 10 is turned off when the image forming apparatus lies in the low-power state 203, the image forming apparatus is brought into the power-off state 205 in a case where it has only the power-off state 205.

On the other hand, when the power-supply switch 10 is turned off in a case where the image forming apparatus has only the high-speed startup off state 204 and the power-off state 205, the CPU 101 has to determine whether to change into the high-speed startup off state 204 or the power-off state 205, and perform processing for the change.

The high-speed startup off state 204 is set by the user operating the console 5. Specifically, the user can set the high-speed startup off state 204 in the image forming apparatus as the need arises.

Figure 3:
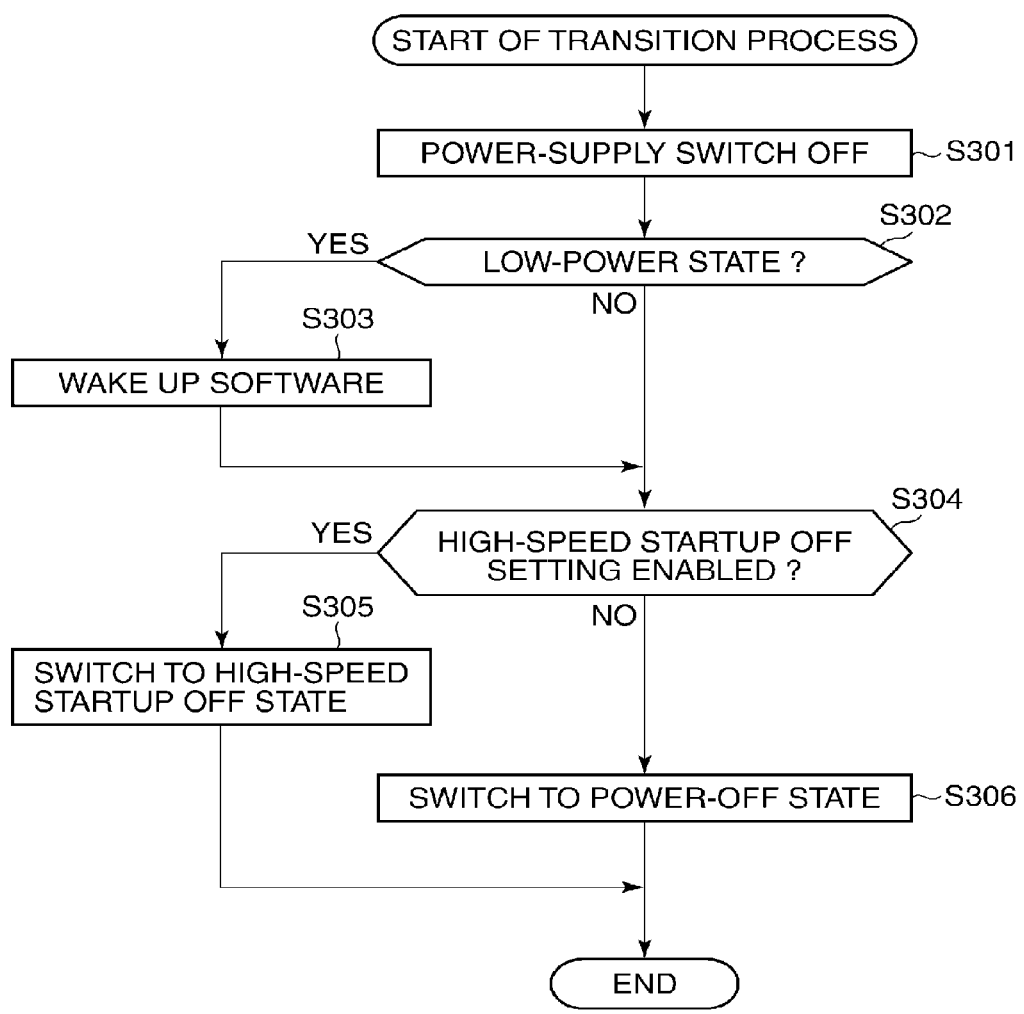
FIG. 3 is a flowchart useful in explaining a transition process carried out in the image forming apparatus shown in FIG. 1.

FIG. 3 is a flowchart useful in explaining a transition process carried out in the image forming apparatus shown in FIG. 1.

Referring to FIGS. 1 to 3, assume that the user now turns off the power-supply switch 10 of the image forming apparatus (step S301). When the power-supply switch 10 is turned off, the CPU 101 determines whether or not the image forming apparatus is in the low-power state 203 (step S302). When the image forming apparatus is in the low-power state 203 (YES in the step S302), the CPU (101) controls the power control units 109 and 128 to switch the image forming apparatus into the standby state 202 and wake up software that controls the image forming apparatus (step S303: software wake-up).

Next, the CPU 101 determines whether or not the setting of the high-speed startup off state 204 is enabled (step S304). It should be noted that when the image forming apparatus is not in the low-power state 203 (NO in the step S302), the CPU 101 proceeds to a process in step S304.

When the setting of the high-speed startup off state 204 is enabled (YES in the step S304), the CPU 101 carries out processing required to switch into the high-speed startup off state 204 to bring the image forming apparatus into the high-speed startup off state 204 (step S305). Then, the CPU 101 terminates the process.

When the setting of the high-speed startup off state 204 is not enabled (NO in the step S304), the CPU 101 carries out processing required to switch into the power-off state 205 to bring the image forming apparatus into the power-off state 205 (step S306). Then, the CPU 101 terminates the process.

As described above, in the present embodiment, in the case where the user sets the high-speed startup off mode when the power-supply switch is turned off in the low-power state, the image forming apparatus can be brought into the high-speed startup off mode.

FIG. 4 is a flowchart useful in explaining a transition process carried out in an image forming apparatus according to a second embodiment of the present invention. The arrangement of the image forming apparatus is the same as that of the image forming apparatus shown in FIG. 1, and state transition is also the same as that described with reference to FIG. 2. It should be noted that in FIG. 4, the same processes as those described with reference to FIG. 3 are denoted by the same reference numerals, and description thereof is omitted.

Referring to FIGS. 1, 2, and 4, when the setting of the high-speed startup off state 204 is enabled (YES in the step S304), the CPU 101 controls the power control units 109 and 128 to reboot the image forming process and brings the image forming process into the standby state 202 (step S405). Then, the CPU 101 carries out processing required to switch into the high-speed startup off state 204 to bring the image forming apparatus into the high-speed startup off state 204.

Although in the second embodiment, when the setting of the high-speed startup off state 204 is enabled, reboot processing is carried out, software is temporarily reactivated. For example, if reboot processing is not carried out when memory leakage occurs and memory runs short, the image forming apparatus returns into the same state (memory exhaustion state) at the time of startup. On the other hand, if reboot processing is carried out, the same state does not occur at the time of startup. It should be noted that if reboot processing is carried out, it takes long time to switch into the high-speed startup off state 204 after the power-supply switch 10 is turned off.

In the first and second embodiments described above, the CPU 101 brings the image forming apparatus into the standby state 202. In general, when bringing the image forming apparatus into the standby state 202, for example, electrical power is supplied to the printer device 4 and the scanner device 2 so as to immediately output an image when a job is accepted. On the other hand, in the first and second embodiments described above, the image forming apparatus temporarily switches into the standby state 202 so as to switch into the high-speed startup off state 204 or the power-off state 205, and in this standby state, no job is accepted. Thus, when the power-supply switch 10 is turned off in the low-power state 203, the supply of electrical power to the printer device 4 and the scanner device 2 may be stopped in the standby state 202 even if the image forming apparatus is temporarily switched into the standby state 202.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-014043 filed Jan. 26, 2011, which is hereby incorporated by reference herein in its entirety.

What is claimed is:

1. A data processing apparatus, comprising:
a process unit configured to process data;
a storage unit configured to store information indicative of a state into which the data processing apparatus is to be brought in a case where an instruction to turn off a power source of the data processing apparatus is received; and
a power control unit configured to bring, in a case where the instruction to turn off the power source of the data processing apparatus is received when the data processing apparatus is in a first power state in which supply of power to said process unit is stopped, the data processing apparatus from the first power state into a second power state in which power is supplied to said process unit,
wherein in a case where the data processing apparatus has been brought into the second power state by said power control unit, said process unit determines a state into which the data processing apparatus is to be brought based on the information stored in said storage unit, and
said power control unit bring the data processing apparatus into the state determined by said process unit.

2. The data processing apparatus according to claim 1,
wherein in a case where said process unit determines that the state into which the data processing apparatus is to be brought is a third power state, said power control unit executes a process to bring the data processing apparatus into the third power state, and
in a case where said process unit determines that the state into which the data processing apparatus is to be brought is a fourth power state, said power control unit executes a process to bring the data processing apparatus into the fourth power state.

3. The data processing apparatus according to claim 2, further comprising a program storage unit configured to store a program executed by said process unit,
wherein power is supplied to said program storage unit in the third power state, and supply of power to said program storage unit is stopped in the fourth power state.

4. The data processing apparatus according to claim 3, wherein power is supplied to said program storage unit in the first power state and the second poser state.

5. The data processing apparatus according to claim 3, wherein said program storage unit is a volatile memory.

6. The data processing apparatus according to claim 5, wherein the volatile memory is a DRAM.

7. The data processing apparatus according to claim 3, wherein said program storage unit holds a program executed by said process unit in the third power state.

8. The data processing apparatus according to claim 2, wherein supply of power to said process unit is stopped in the third power state and the fourth power state.

9. The data processing apparatus according to claim 2, further comprising a job receiving unit configured to receive a print job, wherein supply of power to said job receiving unit is stopped in the third power state.

10. The data processing apparatus according to claim 1, further comprising a power-source switch,
wherein the instruction to turn off the power source of the data processing apparatus is output in response to a user operating said power-source switch.

11. The data processing apparatus according to claim 1, wherein said process unit determines the state into which the data processing is to be brought based on the information stored in said storage unit in response to the data processing apparatus having been brought into the second power state by said power control unit.

12. The data processing apparatus according to claim 1, further comprising a setting unit configured to set the state into which the data processing apparatus is to be brought in a case where the instruction to turn off the power source of the data processing apparatus is received,
wherein information indicative of the state set by said setting unit is stored in said storage unit.

13. The data processing apparatus according to claim 1, further comprising a job receiving unit configured to receive a print job,
wherein power is supplied to said job receiving unit in the first power state.

14. The data processing apparatus according to claim 1, wherein the data processing apparatus is rebooted before the data processing apparatus is brought into the state determined by said process unit.

15. The data processing apparatus according to claim 1, further comprising a print unit configured to print an image on a sheet.

16. A method for controlling a data processing apparatus having a process unit that processes data and a storage unit that stores information indicative of a state into which the data processing apparatus is to be brought in a case where an instruction to turn off a power source of the data processing apparatus is received, the method comprising:
a power control step of bringing, in a case where the instruction to turn off the power source of the data processing apparatus is received when the data processing apparatus is in a first power state in which supply of power to the process unit is stopped, the data processing apparatus from the first power state into a second power state in which power is supplied to the process unit,
a determination step of determining, in a case where the data processing apparatus has been brought into the second power state in said power control step, a state into which the data processing apparatus is to be brought based on the information stored in the storage unit, and
a shifting step of bringing the data processing apparatus into the state determined in said determination step.

17. The method for controlling the data processing apparatus according to claim 16,
wherein in a case where it is determined in said determination step that the state into which the data processing apparatus is to be brought is a third power state, a process to bring the data processing apparatus into the third power state is executed in said shifting step, and in a case where it is determined in said determination step that the state into which the data processing apparatus is to be brought is a fourth power state, a process to bring the data processing apparatus into the fourth power state is executed in said shifting step.

18. The method for controlling the data processing apparatus according to claim 17, wherein power is supplied to a program storage unit that stores a program executed by the process unit in the third power state, and supply of power to the program storage unit is stopped in the fourth power state.

19. The method for controlling the data processing apparatus according to claim 18, wherein the program storage unit is a volatile memory.

20. The method for controlling the data processing apparatus according to claim 19, wherein the volatile memory is a DRAM.

21. The method for controlling the data processing apparatus according to claim 18, wherein a program executed by the process unit is held in the program storage unit in the third power state.

22. The method for controlling the data processing apparatus according to claim 17, wherein supply of power to a job receiving unit that receives a print job is stopped in the third power state.

23. The method for controlling the data processing apparatus according to claim 16, wherein the instruction to turn off the power source of the data processing apparatus is output in response to a user operating a power-source switch of the data processing apparatus.

24. The method for controlling the data processing apparatus according to claim 16, further comprising a setting step of setting the state into which the data processing apparatus is to be brought in a case where the instruction to turn off the power source of the data processing apparatus is received,
wherein information indicative of the state set in said setting step is stored in the storage unit.

25. The method for controlling the data processing apparatus according to claim 16, wherein power is supplied to a job receiving unit that receives a print job in the first power state.

26. The method for controlling the data processing apparatus according to claim 16, wherein the data processing apparatus is rebooted before the data processing apparatus is brought into the state determined in said determination step.

27. The method for controlling the data processing apparatus according to claim 16, further comprising a printing step of printing an image on a sheet.

28. A data processing apparatus, comprising:
a process unit configured to process data;
a storage unit configured to store information indicative of a state into which the data processing apparatus is to be shifted when an instruction to turn off the data processing apparatus is received; and
a power control unit configured to change a power state of the data processing apparatus,
wherein, in a case where the instruction is received when the data processing apparatus is in a first power state in which supply of power to the process unit is stopped,
the power control unit shifts the power state of the data processing apparatus from the first power state to a second power state in which power is supplied to the process unit,
the process unit determines a state into which the data processing apparatus is to be shifted based on the information stored in the storage unit, and the power control unit shifts the power state of the data processing apparatus from the second power state to the state determined by the process unit.

29. The data processing apparatus according to claim 28, wherein in a case where the process unit determines that the state into which the data processing apparatus is to be shifted is a third power state, the power control unit shifts the power state of the data processing apparatus into the third power state, and in a case where the process unit determines that the state into which the data processing apparatus is to be shifted is a fourth power state, the power control unit shift the power state of the data processing apparatus into the fourth power state.

30. The data processing apparatus according to claim 29, further comprising a program storage unit configured to store a program executed by the process unit, wherein power is supplied to the program storage unit in the third power state, and supply of power to the program storage unit is stopped in the fourth power state.

31. The data processing apparatus according to claim 30, wherein power is supplied to the program storage unit in the first power state and the second poser state.

32. The data processing apparatus according to claim 30, wherein the program storage unit is a volatile memory.

33. The data processing apparatus according to claim 32, wherein the volatile memory is a DRAM.

34. The data processing apparatus according to claim 32, wherein the program storage unit holds a program executed by the process unit in the third power state.

35. The data processing apparatus according to claim 32, wherein supply of power to the process unit is stopped in the third power state and the fourth power state.

36. The data processing apparatus according to claim 29, further comprising a network controller configured to receive a print job, wherein supply of power to the network controller is stopped in the third power state and the fourth power state.

37. The data processing apparatus according to claim 28, further comprising a power-source switch, wherein the instruction is output in response to a user operating the power-source switch.

38. The data processing apparatus according to claim 28, wherein the process unit determines the state into which the data processing apparatus is to be shifted in response to the data processing apparatus having been shifted into the second power state.

39. The data processing apparatus according to claim 28, further comprising a setting unit configured to set the state into which the data processing apparatus is to be shifted when the instruction is received, wherein information indicative of the state set by the setting unit is stored in the storage unit.

40. The data processing apparatus according to claim 28, further comprising a network controller configured to receive a print job, wherein power is supplied to the network controller in the first power state.

41. The data processing apparatus according to claim 28, wherein the data processing apparatus is rebooted before the data processing apparatus is shifted into the state determined by the process unit.

42. The data processing apparatus according to claim 28, further comprising a print unit configured to print an image on a sheet.

* * * * *